US006893528B2

(12) United States Patent
Middelstadt et al.

(10) Patent No.: US 6,893,528 B2
(45) Date of Patent: May 17, 2005

(54) WEB MATERIAL ADVANCE SYSTEM FOR WEB MATERIAL APPLICATOR

(75) Inventors: Scott K. Middelstadt, Vancouver, WA (US); James N. Hartman, Parma, ID (US)

(73) Assignee: Adalis Corporation, Vancouver, WA (US)

(*) Notice: Subject to any disclaimer, the term of this patent is extended or adjusted under 35 U.S.C. 154(b) by 231 days.

(21) Appl. No.: 09/843,005

(22) Filed: Apr. 26, 2001

(65) Prior Publication Data

US 2002/0050324 A1 May 2, 2002

Related U.S. Application Data

(63) Continuation-in-part of application No. 09/703,968, filed on Nov. 1, 2000, now abandoned.

(51) Int. Cl.$^{7}$ ................................ B32B 31/00

(52) U.S. Cl. ........................ 156/264; 156/265; 156/302; 156/301; 156/351; 156/354; 156/355; 156/361; 156/363; 156/519; 156/521; 493/86; 493/378

(58) Field of Search ................................ 156/351, 354, 156/355, 361, 363, 264, 265, 302, 519, 521, 300, 301; 493/86, 378

(56) References Cited

U.S. PATENT DOCUMENTS

| | | | | |
|---|---|---|---|---|
| 2,987,108 | A | 6/1961 | Kilmartin | 156/504 |
| 3,618,483 | A | 11/1971 | Helm | 493/345 |
| 3,660,208 | A | 5/1972 | Hubbard | 156/571 |
| 3,886,033 | A | 5/1975 | MacDonald et al. | 156/522 |
| 3,894,905 | A | 7/1975 | Ehlscheid | |
| 3,939,032 | A | 2/1976 | Taitel et al. | 156/505 |
| 3,957,570 | A | 5/1976 | Helm | 156/519 |
| 4,106,974 | A | 8/1978 | Hirsch | 156/504 |
| 4,120,034 | A | 10/1978 | Fisk et al. | 364/518 |
| 4,120,739 | A | 10/1978 | Peeters et al. | 156/506 |
| 4,157,934 | A | 6/1979 | Ryan et al. | 156/504 |
| 4,181,558 | A | 1/1980 | Neubronner | 156/355 |
| 4,190,483 | A | 2/1980 | Ryan et al. | 156/504 |
| 4,332,635 | A | 6/1982 | Holbrook et al. | 156/256 |
| 4,364,787 | A | 12/1982 | Radzins | 156/164 |

(Continued)

FOREIGN PATENT DOCUMENTS

| | | |
|---|---|---|
| DE | 4209262 | 1/1992 |
| EP | 0 776 848 A2 | 11/1995 |
| EP | 0 691 267 | 1/1996 |
| EP | 1 132 325 | 9/2001 |
| GB | 2 143 802 | 2/1985 |
| GB | 2 315 041 | 1/1998 |
| JP | 8-309890 | 11/1996 |
| WO | WO 96/35574 | 11/1996 |
| WO | WO 00/15729 | 3/2000 |
| WO | WO 02/39219 A2 | 5/2002 |

*Primary Examiner*—Linda L Gray
(74) *Attorney, Agent, or Firm*—Klarquist Sparkman, LLP

(57) ABSTRACT

An apparatus for applying a cutting edge tape or a reinforcing tape to a substrate by feeding and cutting lengths of tape and advancing the lengths to a vacuum wheel applicator, the feed section of the apparatus comprising a feed roll, an anvil vacuum roll, and a rotary knife adjacent to the anvil vacuum roll, and means for adjusting the speed of the feed roll and the speed of the anvil vacuum roll to vary the length of the tape advanced to the applicator.

20 Claims, 8 Drawing Sheets

U.S. PATENT DOCUMENTS 4,405,066 A 9/1983 Roccaforte .................... 225/43
4,450,039 A 5/1984 Salvucci et al. ............ 156/504
4,481,053 A 11/1984 Tokuno et al. .............. 156/157
4,506,816 A 3/1985 Roccaforte .................... 225/48
4,580,709 A 4/1986 Roccaforte .................... 225/48
4,589,943 A 5/1986 Kimball et al. ............. 156/256
4,668,328 A 5/1987 Kyytsonen .................. 156/502
4,720,320 A 1/1988 Niemi ........................ 156/504
4,722,489 A 2/1988 Wommer .................. 242/58.4
4,795,510 A 1/1989 Wittrock et al. .............. 156/64
4,917,327 A 4/1990 Asbury et al. .............. 242/156
4,925,521 A 5/1990 Asbury et al. .............. 156/517
5,021,111 A 6/1991 Swenson et al. ............ 156/264
5,029,768 A 7/1991 Asbury et al. ............ 242/58.1
5,078,311 A 1/1992 Taguchi et al. ............... 225/43
5,224,405 A 7/1993 Pohjola ......................... 83/24
5,415,716 A 5/1995 Kendall ...................... 156/256
5,429,576 A * 7/1995 Doderer-Winkler ......... 493/214
5,501,763 A 3/1996 Ueda et al. ................. 156/504
5,573,626 A 11/1996 Rossini et al. .............. 156/361
5,624,526 A 4/1997 Perecman et al. .......... 156/361
5,692,699 A 12/1997 Weirauch et al. ........ 242/556.1
5,775,629 A 7/1998 Cyr ............................ 242/551
5,782,736 A 7/1998 Brizzi et al.
5,839,634 A 11/1998 Pollard et al. ................ 225/39
5,913,991 A 6/1999 Kubota et al. ................ 156/64
5,947,360 A 9/1999 Frank .......................... 225/39
6,007,660 A 12/1999 Forkert ....................... 156/256
6,013,148 A 1/2000 Bluemle ..................... 156/159
6,172,698 B1 1/2001 Iwata et al. ................. 347/171
6,173,876 B1 1/2001 Sano et al. ................... 225/39
6,475,325 B1 11/2002 Parrish et al.
2002/0038686 A1 4/2002 Parrish et al.
2002/0079045 A1 6/2002 Parrish et al.

* cited by examiner

WEB MATERIAL ADVANCE SYSTEM FOR WEB MATERIAL APPLICATOR

RELATED APPLICATION

This application is a Continuation-in-Part of application Ser. No. 09/703,968, filed Nov. 1, 2000, now abandoned.

FIELD OF THE INVENTION

The present invention relates to an improved web material dispenser for advancing a web material to an applicator, such as a tape applicator for applying a strip of tape to form a cutting edge, a reinforcing tape, a box sealer, and the like. The system utilizes a feed roller to advance the web to a vacuum anvil roll where the web material is cut and advanced to a vacuum wheel applicator. In one aspect to a web material delivery system capable of changing the length of the web material delivered to the applicator. The speed of the feed roll and the speed of the independently driven vacuum anvil roll and cutting roller are determined by a motor control and the position of the web material on the substrate is regulated by a programmable logic control and encoder set by an indicator triggered by the substrate.

BACKGROUND OF THE INVENTION

The application of hot melt material to substrates to form laminates in not new. One such patent is U.S. Pat. No. 6,007,660, (Forkert). In this patent, the pinch rollers advance the lamina toward two sensors. The substrate is sensed by a third sensor. When the sensors for the lamina, either 88 or 90 sense the lamina, the feed for the lamina stops and a scissors is actuated. The substrate is driven along a path toward the laminating rollers. After the scissors are actuated, rollers are actuated to advance the substrate. To make sure the substrate is not fed along the path too soon, the substrate is sensed by a third sensor. When the substrate is sensed, the lamina is conveyed and both the lamina and substrate are fed between the laminating rollers. Conventional control mechanisms, i.e., a microprocessor, are used to respond to sensor signals, actuate the scissors, and engage and disengage the clutch-controlled elements of the drive-train. The stopping and starting of the lamina and substrate render such a mechanism to be uneconomical for a hot melt feeder and carton laminator, which operate typically at 600 to 1000 feet per minute (182 meters to 305 meters per minute).

Another relevant patent is U.S. Pat. No. 4,795,510, (Wittrock, et al.), which discloses applying patches of reinforcement material to a web. The patch material is coated with a hot melt adhesive and is advanced to a phasing means, such as vacuum anvil roll 54 (column 5, lines 7 and 8) which provides a selected spatial segregation between the individual patches, and assembling means, such as a stomper roll, which adhesively secures the segregated patches onto selected spaced regions of the moving web layer. Indexing means such as a pull-back roll, selectively displaces the coated substrate material from the knife roll when an assembly feed roll is disengaged from the substrate material. The knife roll, which cuts the patch material after it is on the anvil vacuum roll, acts in response to an indexing means, such as pull-back roll, which selectively displaces the coated patch material from the knife roll when an assembly feed roll is disengaged from the patch material.

SUMMARY OF THE INVENTION

In this application, the term web material, shall be referred to simply as "tape," but is intended to include various ribbon material, various web materials, and various widths of material, particularly tapes with an adhesive such as a hot melt adhesive, a hot melt pressure sensitive adhesive, a hot melt remoistenable adhesive, a water dispersible hot melt adhesive, a biodegradable hot melt adhesive or a repulpable hot melt adhesive, or heat activatable adhesives. Examples of these adhesives are any typical hot melt adhesive such as an ethylene-vinyl acetate copolymer (EVA-based) hot melt adhesive; EMA-based hot melt adhesive (ethylene methylacrylate); EnBA-based hot melt adhesive (ethylene n-butyl acrylate); hot melt adhesive based on polyamides; hot melt remoistenable adhesive based on polyamides and copolyesters; hot melt adhesives based on polyethylene and polypropylene homopolymers, copolymers and interpolymers, rubbery block copolymer hot melt adhesives; or RF (radio frequency) activatable adheisves. The term "substrate" may include films, non-woven webs, paper products, paper board, carton blanks, box board, corrugated board and other sheet materials and web materials, all of various widths. The illustrated embodiment of the invention described below is designed to use a tape with a coating of adhesive applied to a substrate for example, a paper product.

The present invention is directed to a dispenser for a length of tape, comprising a tape feed section for advancing the tape along a predetermined path, a tape applicator section for accepting the tape, and a substrate feed section for advancing the substrate past the applicator section. The tape feed section comprises a feed roll and associated means for advancing tape from a supply, i.e. a pressure roll or increased frictional surface or a positive drive. Further, it includes a vacuum anvil roll for picking up the tape from the feed roll and a knife roll for cutting lengths of tape on the vacuum roll. Drive means rotate the vacuum anvil roll. The vacuum roll has an outer foraminous surface to receive subatmospheric pressure near the surface of the roll and above atmospheric pressure at a desired location about the path of the roll. The vacuum anvil roll has an outer foraminous cylindrical peripheral surface and means for applying atmospheric pressure at said surface throughout a portion of the surface during each rotation thereof. Means support the vacuum roll for rotation about an axis perpendicular to the path of the web material. A cutting wheel (rotary knife roll) positioned near the vacuum roll, for rotation with the vacuum roll, engages the web material on the vacuum roll opposite a hardened insert, to cut the same to the desired length. An application means receives the cut length of web material and advances the cut length to a substrate. Changes in the length of web material can be made with this tape advancing section without mechanical changes to the basic components. The feed roll and the vacuum roll have separate drive means for affording rotation of the feed roll at a peripheral surface speed different from the peripheral speed of the surface of the vacuum roll. The speeds can be effectively adjusted by the use of a motor control and the positioning of a length of tape on the substrate is accomplished by a programmable logic controller so that the length of tape applied and the location of the tape on the substrate can be changed easily.

Further, adhesion application preparation means can be provided for treating the web material prior to and in preparation of application to the substrate.

A dispenser application means carries the length of web material to the substrate. The illustrated application means comprises a vacuum wheel applicator which picks up the length of web material and retains the same on a foraminous surface to carry the length of web material about an arcuate path to an area where it is transferred to the substrate.

The preparation means may be a heater placed about a portion of the arcuate path to heat the web material as it is advanced past the heater. Such preparation means are specifically adapted for use with the hot melt adhesive coated tapes and serve to heat the adhesive to a softened state to adhere to the substrate. Other adhesion prepartion means than heaters for activating webs coated with other types of adheisves can also be used. For example, if a remoistenable adheisve is used, then the adhesion preparation means is a means for supplying mositure; or if a radiant energy, such as RF, activatable adhesive is used, then the adhesion preparation means is a radiant energy source or a RF generator or system, and so on. Also, if a pressure sensitive adhesive coated tape is used, there may not be any need for an adhesion preparation means. There is no stopping and starting of the lamina and substrate which render such a mechanism to be uneconomical for a hot melt feeder and carton laminator which operate typically at 600 to 1000 feet per minute (182 meters to 305 meters per minute).

BRIEF DESCRIPTION OF THE DRAWINGS

The present invention will be described with reference to the accompanying drawing of a preferred embodiment wherein.

DESCRIPTION OF THE PREFERRED EMBODIMENTS

Figure 1:
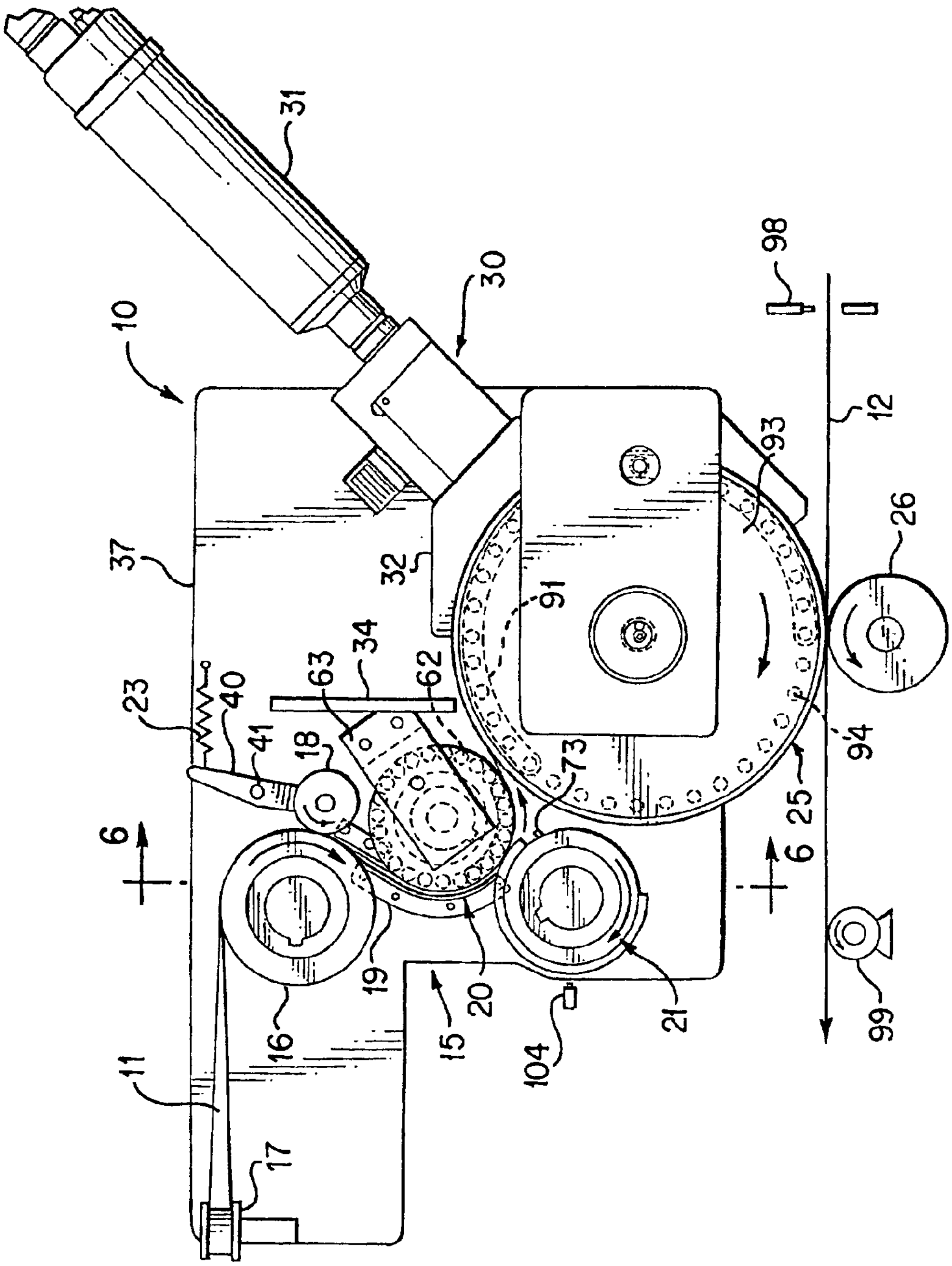
FIG. 1 is a diagrammatic fragmentary elevational view illustrating the features of the dispenser of this invention.
Figure 2:
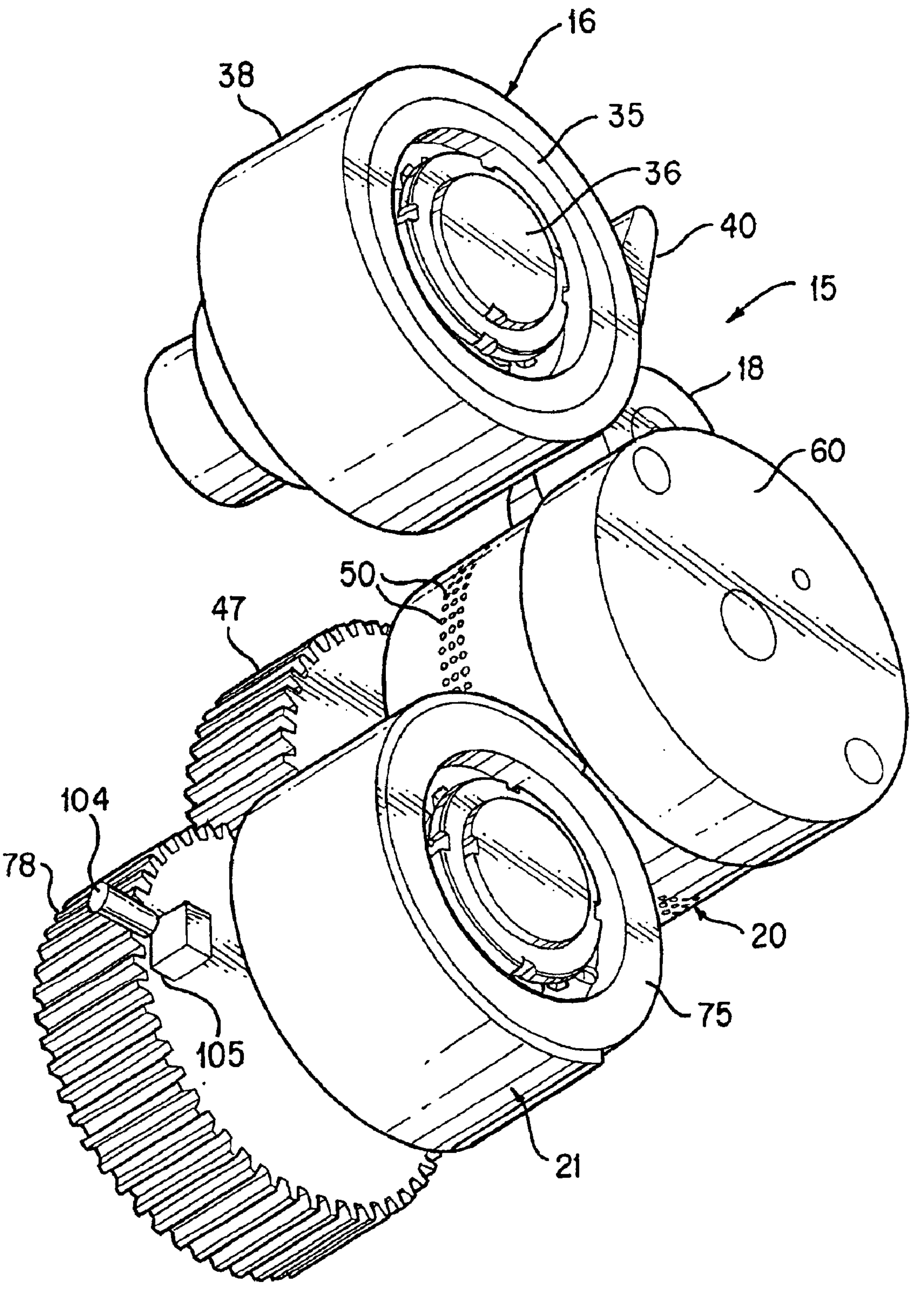
FIG. 2 is a perspective view of the feed section of the dispenser as viewed from the front lower left side as shown in FIG. 1.
Figure 3:
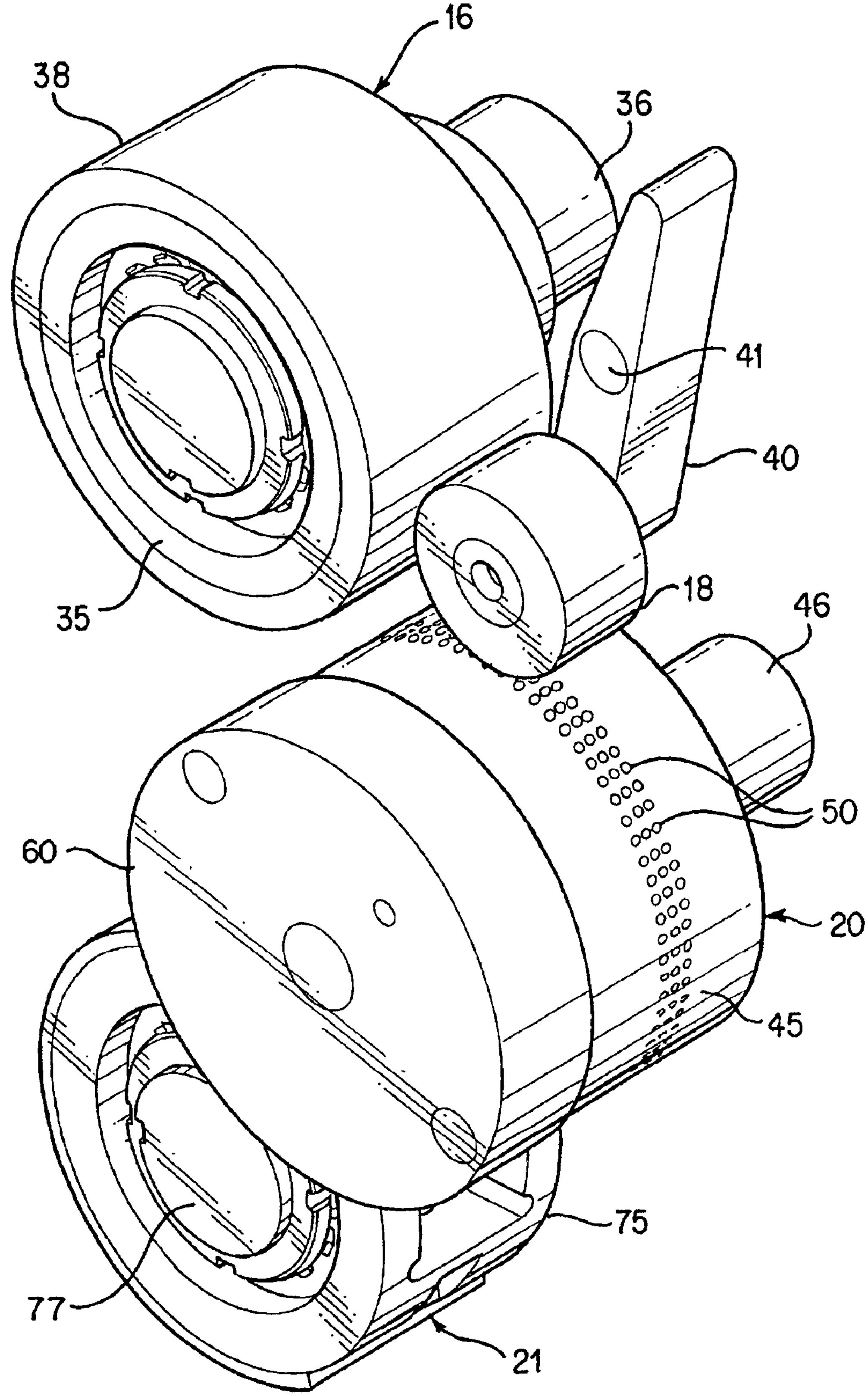
FIG. 3 is a perspective view of the feed section of the dispenser as viewed from the front upper right side.

This invention relates to a machine for the handling of a tape to apply different lengths thereof to a moving substrate, and to place the cut length of tape in the desired position. In real time this means applying the tape to cartons at predetermined locations, to apply the cutting edge as described in copending application Ser. No. 09/154,005 filed Sep. 16, 1998, and assigned to the assignee of this application, or to a web of carton material for reinforcing the carton material or to form a reinforced handle. The application speed can be approximately 1000 feet per minute. An example of cutting edge tape is a film tape coated with adhesive for application to the carton board of a carton for a convolutely wound roll of sheet material in which the tape serves as the cutting edge on the carton for the material. The tape is formed of a polymeric film material in a continuous strip, which is stiff enough, when applied to the free edge of a carton to provide the cutting function. The tape is used in the carton manufacturing process to be applied to the carton material as the same moves through the carton forming machine in the machine direction. The tape is applied at one station in the process to laminate the adhesive coated surface against the carton board and is then cut to form a cutting edge along the edge of the front panel or the closing flap on the lid. The tape may be cut to form a straight edge or a serrated edge. Alternatively, the tape is cut to form serrations along one edge during the manufacture of the rolls of tape. The application of the cutting edge tape takes place at one station and after a registered amount of tape is dispensed, registered and laminated to the carton board adjacent the edge of the carton board forming the free upper edge of the front panel, it is cut from the roll. In either process, a continuous supply of tape is desired. This is described in more detail in co-pending application Ser. No. 09/154,005 incorporated herein by reference.

The advantage of a rotary knife and vacuum anvil roll according to the present invention, is that a variety of lengths can be cut. Tape length changes can be made through a motor control and a programmable logic controller (PLC) which aid in the placement of the cut length in a precise position. This eliminates having to change out any mechanical parts to make the length changes. However, each piece of tape must get transferred from the rotary knife/vacuum anvil roll onto the vacuum wheel applicator. For each rotation of the rotary knife/vacuum anvil roll, the tape gets cut. The leading edge of the yet uncut tape must get directed onto the vacuum wheel applicator before the trailing edge can get cut. One discharge means, or one method of directing the tape onto the applicator is to place a web director/deflector to skive and direct the tape onto the vacuum wheel applicator. Another method is to place an air jet at the point where the tape is to transfer to direct the web material off the vacuum anvil roll toward the applicator. A third method or discharge means is to incorporate vacuum on the anvil roll. Vacuum, i.e. sub-atmospheric pressure, applied to a portion of the periphery of the anvil roll causes the leading edge of the tape to remain held against a portion of the periphery of the anvil roll as the anvil roll rotates, until the vacuum portion ceases and a blowoff port is encountered.

The idea of the vacuum anvil roll is to hold the leading edge of each piece of tape on the anvil roll until it can be transferred onto the vacuum wheel. To transfer the tape onto the vacuum wheel, the vacuum section on the anvil roll ends, followed immediately by a blow off port or jet of air under the free end of the tape to form discharge means on the anvil roll to move the tape end onto the vacuum wheel applicator. Thus, as the vacuum anvil roll rotates, the leading edge of the tape advances past the end of the vacuum created section and encounters the blow off port. The leading edge of the tape is now no longer under the control of the vacuum anvil roll. The blow off force, gravity and subatmospheric pressure, or vacuum at the surface of the vacuum wheel applicator, cause the leading edge of the tape to leave the anvil roll and to fall against the vacuum wheel applicator. As the vacuum wheel rotates, it continues to pick up more and more of the length of tape until the rotary knife makes the cut against the vacuum anvil roll. The trailing end of the cut piece continues to be held by the vacuum anvil roll, until that portion of the tape and the peripheral surface of the vacuum anvil roll rotates past the blow off port. At this point, the entire piece of tape gets transferred onto the vacuum wheel applicator. The vacuum anvil roll holds the leading edge of the next piece of tape until it too is transferred onto the vacuum applicator wheel.

In the following description, the reference numerals refer to like parts throughout the several views of the drawing. The present invention provides an improved dispensing and applicating apparatus 10 for advancing lengths of tape 11 which will be applied to a substrate 12. The substrate may be a carton blank or continuous board, i.e. 26 point paper board but adding the reinforcing tape can make 22 or 24 point board useful. The length of tape applied to a carton blank, not shown, can extend the full length of the carton blank or can be applied only to a portion of the carton length and at a pitch ratio related to the length of the carton blank or web and the position of the length of tape to the carton. The present applicator 10 is described for use with a vacuum wheel applicator 25 which takes the tape 11 advanced to it and applies the cut length to a given area on the carton blank. This places the tape in an area where the blanks are to be cut, forming a cutting edge, or alternatively, generally near a midpoint along the length of a carton blank, for example. The tape is generally an adhesive tape comprising a backing of between 2 mils (0.05 mm) to about 7 mils (0.18 mm) in thickness comprised of a polymeric film selected from the group comprising polyester, polypropylene and polyethylene. The tape and the substrate can then be cut along the center of the tape to form a serrated cutting edge for cartons used to dispense films, paper, or metal wrapping foil.

The tape placed near the midpoint may also be a reinforcing tape and will then be in a position to reinforce a carrying handle, for example, on the finished carton. The carton may vary in size and thus it is important that the machine be capable of varying the length of the tape lengths repeatedly dispensed when the carton length changes, as from a carton for a twelve pack, an eighteen, a twenty-four or for a thirty can carton, or when the pitch length between the middle of one carton size in one run varies from the pitch length of a second carton size.

The applicator 10 comprises a feed section, generally designated 15, which advances tape 11 from a supply, (not shown) and places a cut length on an applicating wheel 25 in a desired length. This applicator vacuum wheel 25 advances the cut lengths of tape 11 to a substrate 12. Further, the illustrated apparatus 10 comprises a tape preparation system 30 for treating the tape for application to the substrate 12. In the illustrated example the preparation system is a heater comprising an air heater 31 and heat directing shroud 32 positioned about an arcuate portion of the vacuum wheel applicator 25. The tape section is transferred to the substrate from the surface of the vacuum wheel applicator 25, as the substrate and tape length pass between the vacuum wheel 25 and a backup roller 26. The use of the air heater 31 produces excess hot air that flows past the shroud 32. Because the tape 11 has the adhesive coated surface adjacent the surface of the vacuum anvil roll 20, an insulative wall 34 is supported by a frame 37 and is positioned between the shroud 32 and the vacuum anvil roll 20 to restrict the heating of the roll 20. The heat shield 34 can be any sheet material that has insulation properties, such as a sheet of Micarta (Micarta is a trademarked brand of International Paper of Purchase, N.Y.). The preparation means may alternatively include a coating system to coat an adhesive to the tape on the applicator 25. Also, a web of adhesive could be transferred from a liner to the tape.

The substrate feed section includes rollers and or belts, as known in the art, to move the substrate toward the nip area, and cooperating sensor 98 and a line speed encoder 99 cooperate with the electronic controls for the placing of the cut length of tape precisely on the carton or carton web.

The feed section 15 comprises a feed roll 16, with the non-adhesive side of the hot melt tape directed toward the surface of the feed roll. The feed roll 16 cooperates with a pressure roller 18, for advancing the tape 11 from a supply thereof over an idler pulley 17 and then around the feed roll 16. The tape 11 contacts about 180 degrees of the feed roll 16. The tape is then threaded between two guides 17 defining a path to the vacuum anvil roll 20, about which it is carried to a transfer area and onto the vacuum wheel applicator 25. A rotary knife roll 21, supported for rotation on an axis parallel to the axes of the feed roll 16 and the vacuum anvil roll 20, cuts the tape 11 to the desired repeatable lengths when the relative speeds of the feed roll 16 and anvil roll 20 are set. The speeds of the periphery of the feed roll 16, the vacuum anvil roll 20 and the rotary knife 21, are changeable to change the length of tape applied to the applicator wheel 25 as the production order is changed.

Figure 6:
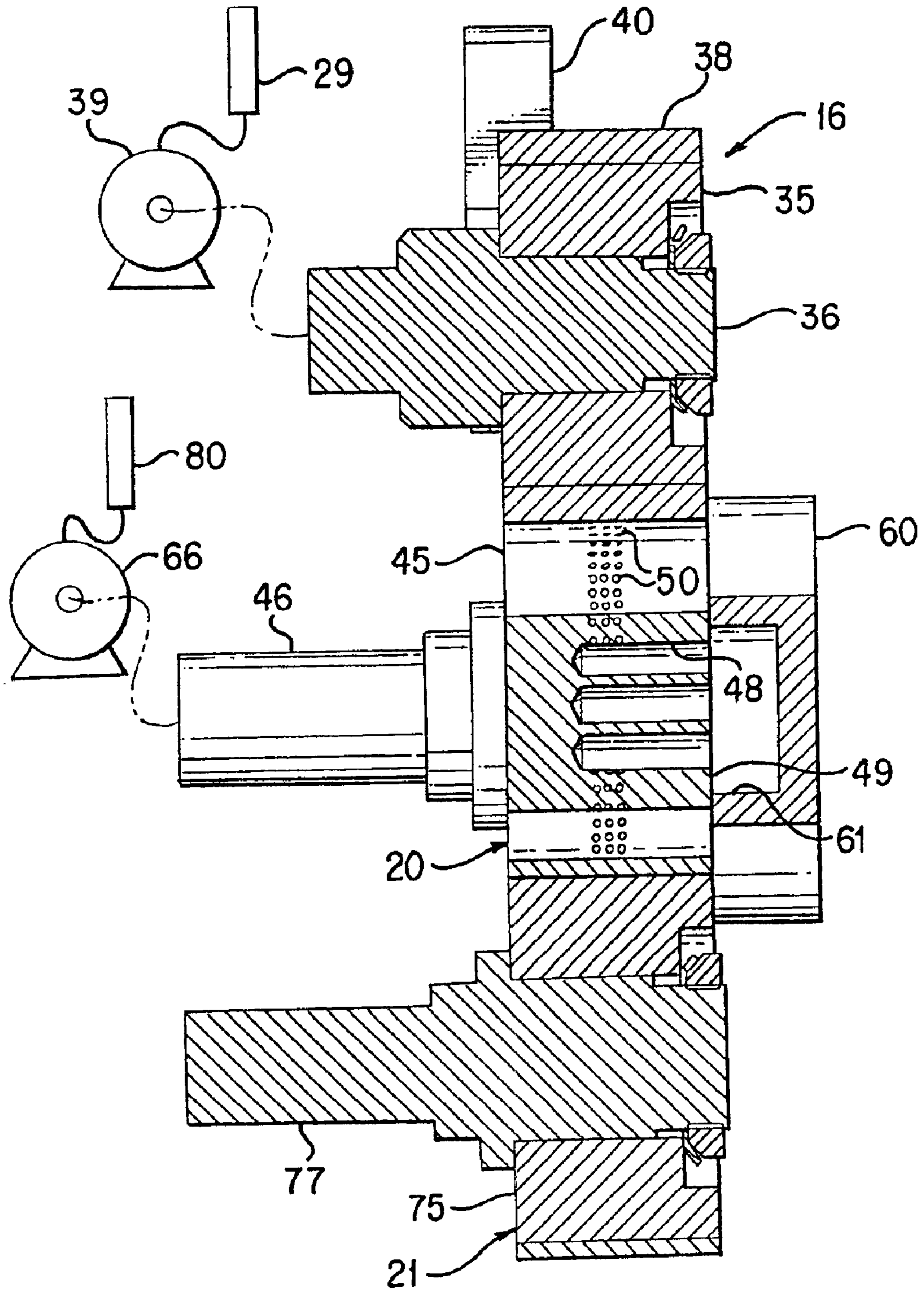
FIG. 6 is a vertical sectional view of the feed roll, the vacuum anvil roll and knife roll, as seen along line 6—6 of FIG. 1, and diagrammatically showing the drive motors and controls.
Figure 7:
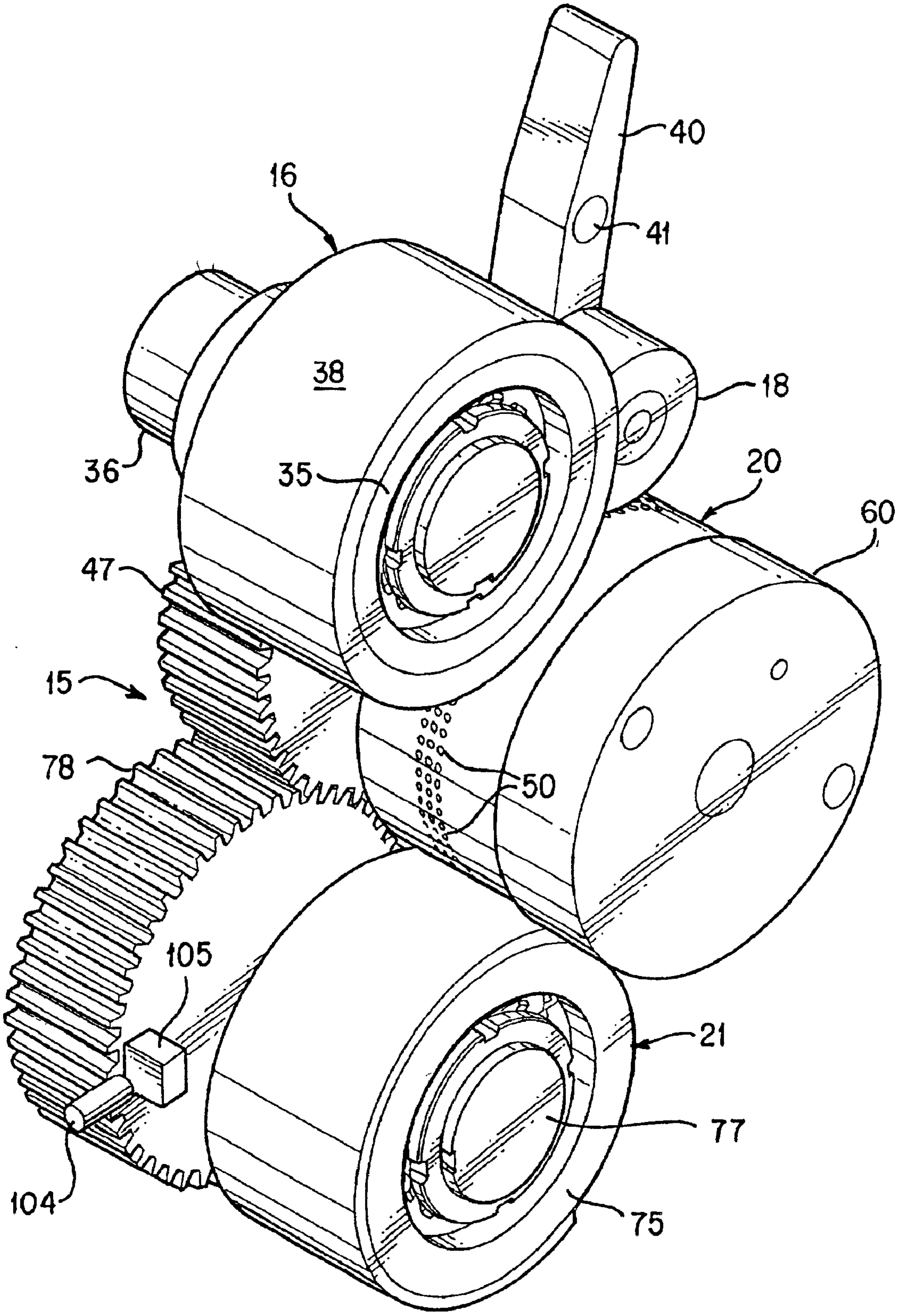
FIG. 7 is a front right perspective view of the feed section showing the drive gears for the vacuum anvil roll and knife roll and the knife sensor.
Figure 8:
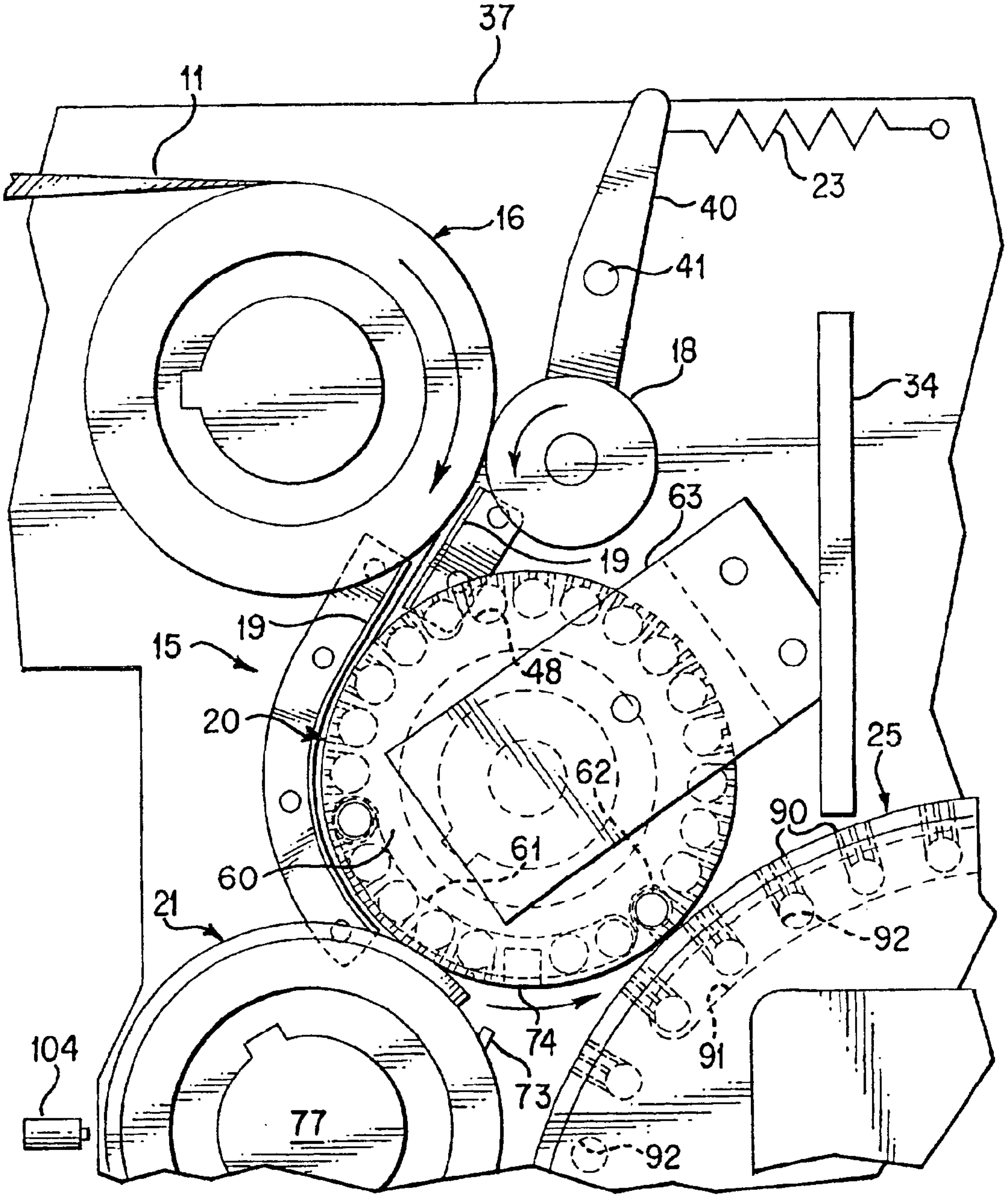
FIG. 8 is an enlarged fragmentary detail view of the feed roll, pressure roller, vacuum anvil roll and knife roll relationship.

The feed roll 16 comprises a hub 35 fixed to a shaft 36 and rotatably supported on the frame 37. The hub 35 has a tire 38 formed thereon, which is a material having a coefficient of friction of about 0.7 to aid in advancing the tape 11. The hub 35 is held on the shaft 36 by a threaded nut held in place by the tabs on a washer positioned against the hub and keyed to the shaft 36. A first motor 39, a DC motor operated through a DC motor controller 29, drives the feed roll 16, see FIG. 6. The pressure roller 18 holds the tape against the feed roll 16. The pressure roller 18 is rotatably mounted on a lever 40 by a stub shaft and the lever 40 is pivoted on a pin 41 to move the pressure roller 18 into engagement with the tape 11 to hold it against the feed roll 16. The lever 40 may be biased by a spring, torsion or tension, as illustrated by a tension spring at 23, to urge the roll 18 toward engagement with the feed roll 16. Alternatively, the web material may be driven by a sprocket on the feed roll.

Figure 5:
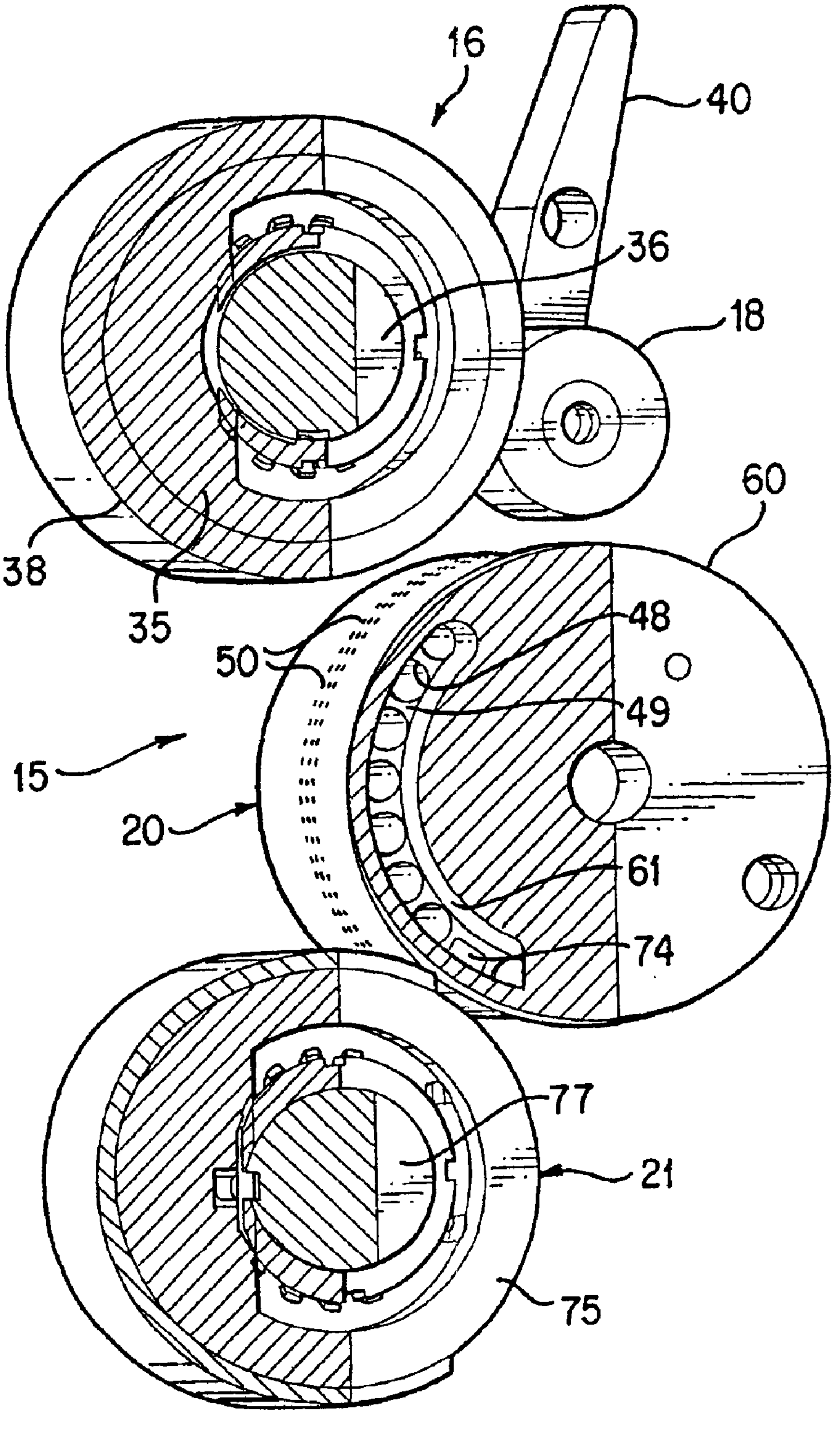
FIG. 5 is a perspective view of the feed section with parts in partial section to illustrate the structure of the various parts.

The vacuum anvil roll 20 comprises a hub 45 mounted on a shaft 46. The hub is formed of metal or composite, especially cold rolled steel and may be coated with any nonstick material, for example, Impreglon#420, a non-stick industrial surface coating available from the DuPont Company, and officially known as "420-104." The adhesive surface of the tape 11 contacts about 90 degrees to about 200 degrees of the surface of the vacuum anvil roll 20, preferably between 160 to 200 degrees of the surface of the vacuum anvil roll 20, and particularly about 180 degrees of the surface of the vacuum anvil roll 20. The anvil roll 20 has a plurality of axially extending holes 48 formed in one end wall 49 of the hub 45. The holes 48 are positioned near the periphery of the roll and are spaced circumferentially to communicate with axial rows of holes 50, in the surface of the roll 20, extending radially into the hub 45 from the peripheral surface. The holes 50 form a foraminous surface about the peripheral surface and near the axial midpoint of the external surface of roll 20. Each row of holes 50 communicate with one of the holes 48 formed in an end wall 49 of the hub 45. In this manner, the holes 50 are subjected to the same pressures as the holes 48. Mounted against the end wall 49 of the hub 45, is a manifold 60. The manifold 60 has a grooved arcuate slot 61 extending about 90 to 180 degrees about its end wall adjacent axially to the end wall 49 of the hub 45, see FIGS. 1 and 5. The manifold 60 is supported in a fixed position by a bracket 63, and the slot 61 is positioned adjacent the path where the tape will engage the surface of the roll 20. The manifold 60 is also formed with a single axially extending bore 62 adjacent one end of the slot 61. This bore 62 is located in the manifold at the transition area where the leading end of the tape 11 is transferred from the vacuum anvil roll 20 to the vacuum wheel applicator 25. The slot 61 of the manifold is connected via openings in the manifold to a pump (not shown) which exhausts air from the slot 61. As the hub 45 of the vacuum roll 20 rotates, the holes 48 serially come into communication with the slot 61 and the air is exhausted from the holes 48 and from the holes 50 creating a force against one side of the tape 11 which is less than atmospheric, a vacuum, and thus the atmospheric pressure holds the tape against the foraminous surface of the roll 20 in the area of the slot 61 as it rotates the holes 48 along the slot 61. Likewise, when a hole 48 moves past the slot 61 it is aligned axially with the bore 62, and that hole 48 is subjected to pressurized air, above atmospheric, and the air passes through the holes 48 progressively as the vacuum roll 20 is rotated past the transition area and the tape is lifted from the surface of the roll 20 and picked up by the surface of the vacuum wheel applicator 25. Air couplings are joined to the outboard side of the manifold 60 permitting air to be exhausted from the slot 61 and air to be forced under pressure into the bore 62. An air line of about 0.25 inch (0.635 cm) diameter can provide adequate air to blow the tape off the anvil roll 20. It will be readily understood that as the vacuum roll 20 rotates, the holes 48 become aligned or substantially aligned with the slot 61 and the holes 50 draw the tape 11 against the surface of the vacuum roll 20. This moves the tape along with the rotation of the anvil vacuum roll. When the holes 48 become aligned with the bore 62 air is forced radially outward through a row of the holes 50 against the tape 11 pushing it off the surface of the roll 20, forming the discharge means for the tape. During the continued rotation, the holes 48 are covered by the adjacent end wall of the manifold 60. The pressure holding the tape on the surface of the roll 20 over the holes 50 is not such that the roll 20 cannot move faster than the tape 11, allowing slippage of the tape 11 on the roll 20, which tape is held at a given speed by the feed roll 16.

The vacuum anvil roll 20, having hub 45 is driven by a shaft 46. Shaft 46 is driven by a second motor 66, such as a servomotor. The motor 66 drives shaft 46 and spur gear 47, which in turn meshes with a second spur gear 78. The spur gear 78 is supported on a rotatable shaft 77, to drive that shaft and the knife roll 21. The servomotor 66 is controlled by a servomotor control 80.

Figure 4:
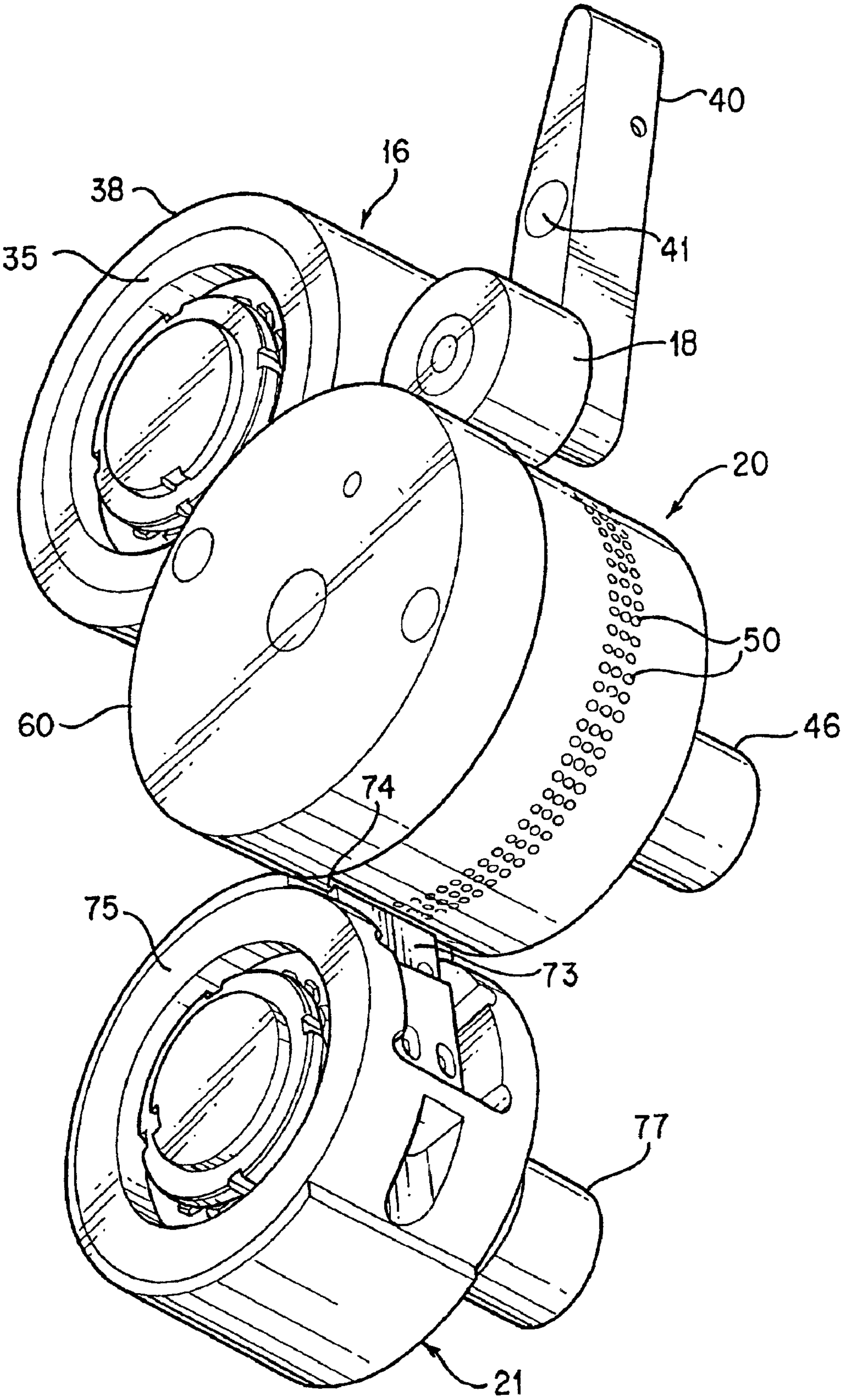
FIG. 4 is a perspective view of the feed section similar to FIG. 3, with the parts rotated to show the knife roll in greater detail.

The vacuum anvil roll 20 is formed to support the tape for cutting into lengths. This cutting is accomplished by a knife blade 73 mounted in the hub 75 of the rotary knife 21 and a hardened insert 74, placed in the peripheral surface of the vacuum anvil roll 20, see FIGS. 4 and 5. The blade 73 is a rectangular blade of steel having essentially four cutting edges. The edges forming the ends of the blade are the cutting edges. When placed in the hub 75, as shown in FIG. 4, an edge extends beyond the periphery of the hub to interfere with the vacuum anvil roller 20 and affect a crush cut of the tape 11 between the hardened anvil insert 74 and an edge of the blade 73.

The rotary knife 21 has the hub 75 mounted on a shaft 77 that is driven by the motor 66 and drive gears 47 and 78 to the shaft 46 of the vacuum anvil roll 20. The roll 20 and knife 21 are driven at the same speed and each time the blade 73 makes contact with the vacuum roll 20 it is at the location of the insert 74. The servomotor control 80 for the motor 66 and the DC motor controller 29 can change the relationship of the speeds of the feed roll 16 to the peripheral speed of the vacuum anvil roll 20. When the speeds are the same, the length of tape fed to the applicator 25 is equal to the peripheral length of one revolution of the vacuum anvil roller 20. As the speed of the vacuum anvil roll 20 increases with respect to the peripheral speed of the feed roll 16 the lengths of tape get shorter. Thus the motor control can adjust the relative peripheral speeds but the speed of the vacuum anvil roll and rotary knife is always equal (=) to or greater (>) than the speed of the feed roll 16.

The vacuum wheel applicator 25 is also provided with a foraminous surface formed by a series of holes 90 in axial extending rows connecting with axial holes 92 in the side wall of the wheel. These holes 92 are positioned about the end wall near the periphery and during rotation or the wheel, communicate with a groove 91 in a manifold 93 which groove or slot 91 extends about 270 degrees about the circumference of the wheel 25 to carry the cut length of tape from the transfer area near the air jet 62, to the area of transfer to the substrate 12 at the application area defined by backup roller 26.

The tape length placed upon the substrate, carton blanks or continuous carton stock, is controlled by the PLC and DC motor controller 29 for the motor 39. The PLC and motor controller 29 receive line speed information from a line speed encoder 99 positioned along the substrate feed path and driven thereby. The peripheral speed of the vacuum wheel applicator 25 is matched to the line speed of the substrate. In cases where the tape length extends across the entire length of the carton, the PLC and motor controller 29 for motor 39, command motor 39 to rotate feed roll 16 and feed tape at a rate equal to the line speed as sensed by the line speed encoder 99. When beginning a production run of cartons requiring a tape length less than that of carton length, the machine operator first puts the length of tape information into the PLC and controller 29 for motor 39. For a tape length equal to one-half the carton length, motor 39 would rotate feed roll 16 at a rate equal to one-half of the line speed. Any one of a multitude of tape lengths can be cut and placed on the substrate. A specific tape length is dictated by a particular carton production job order. A machine operator simply puts information into the PLC and motor controller 29 for motor 39 prior to the start of the tape application production run. Any one of a multitude of tape lengths can be cut and placed as dictated by a particular carton production job order without having to stop the production line application machinery for a time sufficient to change out mechanical parts.

Surprisingly, the applicator of the present invention is very versatile and can be adapted to applying any discrete piece of tape of any length, at any position on a substrate of any shape or size. The length of the tape can also be varied at will.

To position the length of tape properly on the substrate, box blanks which are spaced, or continuous carton stock, a sensor 98 having cooperating elements, is positioned along the path of the substrate. The sensor 98 will detect the leading edge of a carton or printed indicia on the carton material, and send this information to the PLC and to the servomotor controller 80. The signal starts the count to the programmable logic controller (PLC) which determines the position of the length of tape in relationship to the edge of the carton. The PLC and servomotor controller 80 and motor 66 use this information to control the rotational speed of the vacuum anvil roll 20 and knife roll 21 in order to effect a crush cut of the tape 11 between knife 73 and anvil insert 74. Exactly when the cut gets made, relative to the position of the moving carton as the carton moves towards the nip between vacuum wheel applicator 25 and backup roller 26, defines where the tape gets positioned properly on the carton relative to the edge of the carton. For each complete revolution of the vacuum anvil wheel 20 and knife roll 21, the tape gets positioned on the carton relative to the edge of the carton. For each complete revolution of the vacuum anvil roll 20 and knife roll 21, a knife sensor 104 and a sensor lug 105 that rotates with the hub 75 detects the rotational position of the knife roll 21. This signal information is used to update the PLC and servomotor controller 80 as to the exact position of the knife blade 73. This information is used by the PLC and servomotor controller 80 to continuously control the rotational speed of the vacuum anvil roll 20 and knife roll 21, in order for a crush cut of the tape 11 to occur at the correct position for each carton.

When beginning a production run of cartons, a machine operator first puts tape position information into the PLC and servomotor controller 80 prior to the start of the tape application production run. Any one of a multitude of tape positions relative to an edge or index mark can be placed as dictated by a particular carton production job order without having to stop the production line application machinery in order to change out mechanical parts.

Having described the invention with reference to accompanying illustrations of the apparatus of the present invention, it is contemplated that engineering changes can be made without departing from the spirit or scope of the invention as set forth in the appended claims.

We claim:

1. A tape assembly for feeding a predetermined length of tape onto a substrate in predetermined registry with the substrate, said feed assembly comprising:

a feed roll for advancing tape from a supply thereof along a predetermined path at a first speed;

a vacuum roll with an anvil insert for accepting said tape from said feed roll;

a rotary knife having blade means engageable with said vacuum roll for cutting said tape against said vacuum roll;

a vacuum wheel applicator for receiving said cut tape from said vacuum roll and placing said cut tape on a substrate, the vacuum wheel applicator being positioned adjacent to said vacuum roll;

a drive for said vacuum roll to provide a predetermined peripheral speed thereof different than said first speed for advancing said tape toward said vacuum wheel applicator in predetermined lengths; and a motor controller means for changing said first speed and said predetermined speed to adjust the length of tape advancing on said vacuum roll before being cut by said rotary knife driven at said predetermined speed.

2. A tape feed assembly according to claim 1, further comprising drive means for said vacuum wheel applicator to move said cut tape from said vacuum roll to said substrate, drive means for rotating said vacuum wheel applicator, said vacuum roll drive means and said drive means for said vacuum wheel applicator affording peripheral speeds different than that of said feed roll, and an adjustable control for affording the desired length of tape to be dispensed and variations in the registration of said tape on a substrate.

3. A tape feed assembly according to claim 2, comprising a signal generator for detecting the movement of said substrate and for controlling said adjustable control and motor control for operating said vacuum roll and said rotary knife to place the predetermined length of tape in the desired position on the substrate.

4. A tape feed assembly according to claim 1, further comprising an adhesion preparation means for preparing the length of tape as it is passed between said vacuum roll and the substrate.

5. A tape feed assembly according to claim 4, wherein said adhesion preparation means comprises a heater.

6. A tape feed assembly according to claim 1, wherein said drive for said vacuum roll includes a line speed encoder and a programmable logic controller and said motor controller means includes a first motor for the feed roll and a second motor for the vacuum roll drive to provide a tape drive speed that will meet at least one production run requirement.

7. A web material feed assembly, comprising:

a feed roll configured to advance web material along a predetermined path;

a vacuum roll configured to receive the web material advanced by the feed roll;

a rotary knife positioned near the vacuum roll and configured to engage the web material at a location on the vacuum roll to cut the web material into a cut web material length;

a vacuum wheel applicator configured to receive the cut web material length and advance the cut web material length onto a substrate, the vacuum wheel applicator defining a continuous foraminous cylindrical peripheral surface a first sensor positioned to detect a location on the substrate for applying the web material to the substrate and generate a first signal identifying the location;

a second sensor positioned to detect the rotational position of the rotary knife and generate a second signal identifying the rotational position; and a controller configured to receive the first signal and the second signal and control the peripheral speed of at least the rotary knife or the vacuum roll in response to the first signal and the second signal.

8. A web material feed assembly, comprising:

a feed roll configured to advance web material along a predetermined path;

a vacuum roll configured to receive the web material advanced by the feed roll;

a rotary knife positioned near the vacuum roll and configured to engage the web material at a location on the vacuum roll to cut the web material into a cut web material length;

a vacuum wheel applicator configured to receive the cut web material length and advance the cut web material length onto a substrate, the vacuum wheel applicator defining a continuous foraminous cylindrical peripheral surface; and an adhesion preparation means for activating the web material.

9. A web material feed assembly according to claim 8, wherein the adhesion means comprises a heater.

10. A web material feed assembly, comprising:

a feed roll configured to advance web material along a predetermined path;

a vacuum roll configured to receive the web material advanced by the feed roll;

a rotary knife positioned near the vacuum roll, and configured to engage the web material at a location on the vacuum roll to cut the web material into a cut web material length;

an applicator configured to advance the cut web material length onto a substrate;

a first sensor positioned to detect a location on the substrate for applying the web material to the substrate and generate a first signal identifying the location;

a second sensor positioned to detect the rotational position of the rotary knife and generate a second signal identifying the rotational position; and a controller configured to receive the first signal and the second signal and control the peripheral speed of at least the rotary knife or the vacuum roll in response to the first signal and the second signal.

11. A web material feed assembly according to claim 10, wherein the peripheral speed of the rotary knife and the vacuum roll are controllable so that the timing of the cutting of the web material at a location on the vacuum roll defines the registry of the cut web material length with the substrate.

12. A web material feed assembly according to claim 10, wherein the substrate is not a continuous substrate.

13. A web material feed assembly according to claim 10, wherein the substrate comprises an individual carton blank.

14. A web material feed assembly according to claim 10, wherein the peripheral speed of the feed roll, the vacuum roll, and the rotary knife are controllable so that the peripheral speed of the vacuum roll and the rotary knife is equal to or greater than the peripheral speed of the feed roll.

15. A web material feed assembly according to claim 14, wherein the peripheral speed of the vacuum roll and the peripheral speed of the rotary knife are the same.

16. A web material feed assembly according to claim 10, wherein the applicator comprises a vacuum wheel applicator.

17. A web material feed assembly according to claim 10, wherein the feed roll, the vacuum roll, and the rotary knife are configured so that the respective peripheral speed of each of the feed roll, the vacuum roll, and the rotary knife are controllable such that the length of the cut web material length may be adjusted and the cut web material length may be registered with the substrate.

18. A web material feed assembly 10, comprising:

a feed roll configured to advance web material along a predetermined path;

a vacuum roll configured to receive the web material advanced by the feed roll;

a rotary knife positioned near the vacuum roll, and configured to engage the web material at a location on the vacuum roll to cut the web material into a cut web material length;

an applicator configured to advance the cut web material length onto a substrate; and an adhesion preparation means for activating the web material.

19. A web material feed assembly according to claim 18, wherein the adhesion preparation means comprises a heater.

20. A web material feed assembly according to claim 19, wherein the heater is positioned about an arcuate portion of the applicator.

* * * * *